US012724155B2

(12) United States Patent
Blasch et al.

(10) Patent No.: US 12,724,155 B2
(45) Date of Patent: *Sep. 1, 2026

(54) SURROUND-VIEW IMAGING SYSTEMS

(71) Applicant: Jabil Optics Germany GmbH, Jena (DE)

(72) Inventors: Ian Blasch, Boise, ID (US); Norbert Leclerc, Heidelberg (DE)

(73) Assignee: Jabil Optics Germany GmbH, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/970,082

(22) Filed: Dec. 5, 2024

(65) Prior Publication Data

US 2025/0102678 A1 Mar. 27, 2025

Related U.S. Application Data

(63) Continuation of application No. 18/033,616, filed as application No. PCT/EP2020/080079 on Oct. 26, 2020, now Pat. No. 12,196,863.

(51) Int. Cl.
*G02B 13/06* (2006.01)
*G01S 7/481* (2006.01)
*G01S 17/894* (2020.01)

(52) U.S. Cl.
CPC .......... *G01S 17/894* (2020.01); *G01S 7/4814* (2013.01); *G02B 13/06* (2013.01)

(58) Field of Classification Search
CPC .... G01S 17/894; G01S 7/4814; G01S 7/4865; G02B 13/06; G03B 37/06
USPC .......................................................... 348/46
See application file for complete search history.

(56) References Cited

U.S. PATENT DOCUMENTS

| | | | | |
|---|---|---|---|---|
| 10,055,854 | B2 | 8/2018 | Wan et al. | |
| 2009/0066782 | A1* | 3/2009 | Choi | H04N 25/47 348/E5.022 |
| 2010/0020227 | A1 | 1/2010 | Robinson et al. | |
| 2010/0238568 | A1 | 9/2010 | Togino et al. | |
| 2010/0238569 | A1 | 9/2010 | Chang | |

(Continued)

FOREIGN PATENT DOCUMENTS

| | | | |
|---|---|---|---|
| CN | 102292980 | A | 12/2011 |
| CN | 103913929 | A | 7/2014 |

(Continued)

OTHER PUBLICATIONS

Office Action issued in corresponding CN Application No. 202080108126.4, dated Jul. 1, 2026.

*Primary Examiner* — Jamie J Atala
*Assistant Examiner* — Mahmoud Kamal Abouzahra
(74) *Attorney, Agent, or Firm* — Young Basile Hanlon & MacFarlane, P.C.

(57) ABSTRACT

A surround-view imaging system for 3D imaging of a surrounding of the system which avoid saturation and over-exposure of an associated image detector, comprising an imager and an illuminator. The illuminator and the imager are arranged one over another and separated from one another by a distance to form an intermediate region which is neither in the field of view of the illuminator nor in the field of view of the imager, and corresponding imager for such surround-view imaging system.

6 Claims, 8 Drawing Sheets

(56) References Cited

U.S. PATENT DOCUMENTS

| | | | | |
|---|---|---|---|---|
| 2014/0192258 | A1* | 7/2014 | Yang | H04N 23/56 348/370 |
| 2015/0346582 | A1* | 12/2015 | Aikio | G03B 37/06 348/36 |
| 2016/0188985 | A1* | 6/2016 | Kim | G02B 17/00 701/28 |
| 2018/0146186 | A1* | 5/2018 | Akkaya | H04N 13/254 |
| 2018/0227566 | A1* | 8/2018 | Price | B60K 35/53 |
| 2020/0068102 | A1 | 2/2020 | Tilleman | |
| 2020/0151485 | A1* | 5/2020 | Choi | G06V 20/58 |
| 2021/0278639 | A1* | 9/2021 | Antier | G02B 17/0808 |

FOREIGN PATENT DOCUMENTS

| | | | |
|---|---|---|---|
| CN | 207096551 | U | 3/2018 |
| CN | 110006904 | A | 7/2019 |
| CN | 110249235 | A | 9/2019 |
| CN | 110383803 | A | 10/2019 |
| WO | 2013179280 | A1 | 12/2013 |

* cited by examiner

Prior Art Fig.2a

SURROUND-VIEW IMAGING SYSTEMS

CROSS-REFERENCE TO RELATED APPLICATION(S)

This application is a continuation of U.S. application Ser. No. 18/033,616, filed Apr. 25, 2023, which is a national stage entry of International Patent Application Serial No. PCT/EP2020/080079, filed Oct. 26, 2020, the entire disclosures of which are hereby incorporated by reference.

TECHNICAL FIELD

The present invention refers to surround-view imaging systems for three dimensional (3D) imaging of a surrounding of the systems which avoid saturation and overexposure of an associated image detector. Further, a corresponding imager for such surround-view imaging systems is disclosed.

BACKGROUND

For 3D imaging systems or sensors which can locate objects in a 3D surrounding of the system, there are different approaches available which are based on several technologies such as light detection and ranging (LiDAR), time of flight (ToF, direct and indirect versions), amplitude or frequency modulated illumination, structured light, etc. Such systems are found in autonomous mobile robots (AMRs), industrial mobile robots (IMRs), and automated guided vehicles (AGVs) like lift trucks, forklifts, cars, drones, etc. to avoid collisions, to detect obstacles, for passenger monitoring and for observing keep-out-zones for machines and robots. These systems can also be used for collaborative robotics, security and surveillance camera applications.

If the solution is optics-based and an array detector (e.g. CMOS sensor, CCD sensor, array of photodiodes, . . . ) is used in order to avoid moving parts in the system, then the receiving lens, which images the surrounding onto an associated image detector, is a highly critical element. The lens must allow a high resolution over a wide field of view in the horizontal and the vertical direction. At the same time, it should show even imaging properties without vignetting and a high light throughput (small f-number) to achieve a long detection range.

For wide horizontal fields of view, e.g. larger than 120 degrees, a fisheye lens can be used in the upright position. However, a conventional fisheye lens has several disadvantages, such as high angles of incidence and associated coating problems. Further problems are a wide field of view in combination with low resolution, low f-number and the relative illumination (vignetting-free). These drawbacks can be avoided by using a catadioptric lens system in which mirrors and lenses are combined to form the image. However, catadioptric lens systems typically have a central obstruction and the f-number is fixed to the overall designed focal ratio (the diameter of the primary mirror divided by the focal length). This means that the exposure cannot be controlled by an adjustable diaphragm or the like. Instead, exposure is usually adjusted by the placement of neutral density filters on the front or rear of the lens. These approaches decrease the sensitivity of the system and reduce the signal-to-noise ratio (SNR).

However, due to the required wide horizontal and vertical field of view of surround-view imaging systems, the problem of saturating an associated image detector is a general problem in such imaging systems because the intensity of received imaging light can vary greatly between different directions from which the light is incident. An image of the surrounding of the system may thus be overexposed for light from some angle regions while others may still be underexposed. Optimizations like High Dynamic Range (HDR) techniques could be applied, but are difficult to implement with depth-sensitive technologies, which typically require a constant time base between the individual images of frames of an image detector.

The objective problem of the invention is thus related to the constant problem of avoiding saturation and overexposure of an associated image detector in a surround-view imaging system. Therefore, surround-view imaging systems and corresponding imagers are required which allow a selective limitation or control of the intensity of imaging light to be received by an associated image detector.

SUMMARY

The invention solves the objective problem by providing an imager for a surround-view imaging system as defined in claim 1 and by providing surround-view imaging systems as defined in claims 2, 4, 6 and 9.

In a first aspect of the invention, an imager for a surround-view imaging system is proposed. The imager comprises an image detector and a cylindrically shaped monolithic catadioptric lens having a corpus with a mantle, a top surface and a bottom surface; wherein in a field of view of the imager imaging light from a surrounding of the imager enters the corpus by the mantle, is firstly reflected by a circumferential first aspheric lens region arranged around a center of the bottom surface, is secondly reflected by a second aspheric lens region arranged at a center of the top surface, and leaves the corpus towards the image detector by a third aspheric lens region at the center of the bottom surface.

An imager is to be understood as a device which is able to receive, focus and detect imaging light entering the imager from a surrounding of the imager. It therefore typically comprises at least an (preferably ring-shaped circumferential 360 degrees) entrance aperture adjacent to the surrounding, a lens or other optical element to generate an image of the surrounding and an associated image detector to store the generated image of the surrounding for further processing. Since the generation of the image is the far most critical aspect for ensuring a good image quality, instead of using a single lens or optical element, complex lens systems (or optical component systems in general) for the correction of occurring aberrations may be used in an imager. An imager can be a device which uses ambient light for imaging (e.g. 3D visible or infrared light) or is specifically adapted to image reflected light from an external illumination light source (illumination light) as imaging light (e.g. flash LIDAR).

The imaging light enters the monolithic lens via its cylindrical side surface and is successively reflected by two aspherical mirror (or mirrored) surfaces. The first aspherical mirror surface interacting with said light can be a Forbes asphere (G. W. Forbes, "Shape specification for axially symmetric optical surfaces," Opt. Express 15(8), 5218-5226 (2007), whereas the other mirror surface can exhibit a standard aspherical description. As a result of the usage of a Forbes asphere, for the above-mentioned surface, an improved optical performance can be obtained.

The imaging light exits the lens via the third aspherical surface (e.g. standard asphere), which adds an additional degree of freedom to the system's ability to correct optical aberrations. Further benefits of a monolithic design compared to classical fisheye dome lenses are the realization of moderate surface tangent slopes and angles of incidence, as well as a smaller element diameter. Compared to a solution with single mirror elements, the monolith offers more simple mechanical mounting options and can be manufactured much more precisely with low tolerances.

Further, in contrast to standard fisheye lenses, the proposed monolithic catadioptric lens design limits the field of view of the imager in the vertical direction in order to avoid saturation and overexposure of an associated image detector. In particular, the system could have a horizontal and vertical field of view of 360 degrees×60 degrees. With the proposed lens in the upright position, the 60 degrees may be divided, for example, into 45 degrees upwards and 15 degrees downwards from the horizontal plane. However, with this design wider horizontal and vertical fields of view of up to 360 degrees×120 degrees can also be easily realized. By limiting the field of view to required angle ranges, only imaging light from relevant regions of the surrounding may enter the lens and the imager. A smaller vertical field of view thus reduces the possibility of detector saturation from accidentally captured ambient and scattered light. In particular, for ambient light which is reflected under flat angles of incidence (e.g. a bright reflection of evening sunlight on a wet road) an entry into the imager can be effectively suppressed.

The lens may, for example, be designed to have an f-number of 1.5 over the whole field of view without vignetting. Preferred f-numbers are in a range between 1.2 and 1.8, more preferred in a range between 1.4 and 1.6. Due to the compact monolithic design of the lens, aberrations can be effectively corrected already during production of the lens and without requiring a complex and error-prone post-production assembling process. This also ensures a good long-term stability of the imager and makes the lens relatively independent of variations of external environmental parameters like temperature or humidity.

As the monolith already comprises 3 aspherical surfaces, the rest of the optical system can be managed with simple spherical lenses only, while still ensuring a good optical performance (e.g. MTF, distortion, etc.) at moderate costs. The distortion can be chosen so that the vertical and horizontal resolution at an image detector with quadratic pixels is (at least approximately) the same. Other distortions can be chosen to obtain a demanded resolution. However, to further improve the optical properties of the lens, also the region of the mantle where the imaging light from a surrounding of the imager enters the corpus may comprise an additional aspherical shape. In this case even 4 aspherical surfaces may be present on the lens in order to get a higher performance and/or lower or improved distortion properties.

In a preferred embodiment, the image detector may have an active detection region which is adapted to the image size. As the central region of the image, which can correspond to viewing angles outside the field of view of the imager, may not be relevant for imaging, these regions of the image detector can be completely omitted or suppressed during image readout or detector mapping. This has again the advantage that passive regions of the image detector cannot be saturated by accidentally captured ambient and scattered light. Furthermore, due to the fact that no readout of insignificant detector regions has to be performed, the effective frame rates of a specific type of detector can be increased at some detector designs. Through higher frame rates, the accumulation of optically induced charge carriers in the individual pixels of a detector can be reduced such that the SNR of the detector can be optimized for image detection over a wide dynamic range without using other HDR techniques.

Another aspect of the invention relates to a surround-view imaging system for imaging a surrounding of the system, comprising an imager and an illuminator; wherein the illuminator is adapted to illuminate in a field of view of the illuminator the surrounding of the system such that illumination light that is reflected by the surrounding can be imaged by the imager in a field of view of the imager as imaging light; wherein the illuminator and the imager are arranged one over another and separated from one another by a distance d to form an intermediate region which is neither in the field of view of the illuminator nor in the field of view of the imager. Preferably, the imager is located above the illuminator.

An illuminator is to be understood as a device which is able to emit illumination light in a surrounding of the illuminator. In a surround-view imaging system, an illuminator may provide a light impulse (e.g. flash LIDAR), which is reflected by objects in the surrounding and which then can be imaged as imaging light by an associated imager having an image detector (e.g. CMOS image sensor, CCD image sensor). However, an illuminator can also be configured to provide a temporally and/or spectrally well-defined light field (e.g. standard LIDAR or ToF) which also interacts with objects in the surrounding of the illuminator to be reflected and which can be imaged afterwards. The term "illuminator" is therefore not restricted to a specific type of light source or a specific type of illumination for the surrounding. The discussed types of surround vision imaging systems are usually referred to as active imaging systems. In contrast, passive surround-view imaging systems are designed to use only ambient light for imaging and therefore they do not require an illuminator as an essential component.

In active imaging systems, the illumination typically suffers from the problems of strong overexposure and multipath illumination. Since the illumination power density decreases with the distance square from the source of the illumination, the power density near the source is very high. If the imaging aperture and the illumination aperture are vertically not separated by a certain distance and there is an object close to the sensor (e.g. wall or box), saturation and overexposure of the sensor may occur. This overexposure at certain pixels can even saturate neighboring pixels of the image detector or bring misdirected light to neighboring pixels. This would result in incorrect distance information from the sensor system.

By arranging the illuminator and the imager one over another and separated from one another by a distance d, an intermediate region which is neither in the field of view of the illuminator nor in the field of view of the imager can be formed nearby. This avoids saturation and overexposure by limiting the vertical field of view (in the sense of a limited field of vision).

Preferably, the distance d is between 50 mm and 500 mm, more preferred between 75 mm and 250 mm, and even more preferred between 100 mm and 200 mm. For an exemplarily surround-view imaging system having an imager with a specific vertical field of view of 40 degrees (+25 degrees upwards and −15 degrees downwards from the horizontal plane) and an illuminator with an identically specified vertical field of view of 40 degrees, a particularly preferred distance d is 160 mm, so that the two fields of view begin to overlap 217 mm from the central axis of the stacked illuminator and imager assembly. This means that an intermediate region, formed directly around the central axis of the system, which is where saturation and overexposure are most likely to appear, is completely omitted from imaging.

Preferably, the field of view of the illuminator comprises a primary illumination region with high maximum illumination power and a secondary illumination region arranged between the primary illumination region and the imager with lower maximum illumination power. While the primary illumination region may correspond to the field of view in an embodiment described above, the secondary illumination region may be used to reduce the volume of the "blind" intermediate region formed because of the distance d between the illuminator and the imager. In fact, the secondary illumination region may be configured to fill out a large part of said intermediate region, however, due to the lower maximum illumination power, the problem of saturation and overexposure can still be reduced compared to an illumination with high maximum illumination power for both illumination regions. Therefore, the idea of this embodiment is that in imaging regions which are particularly vulnerable to saturation and overexposure of an associated image detector, the illumination power is reduced compared to other spatial regions in which the fields of view from the illuminator and the imager overlap.

Preferably, the secondary illumination region is formed by a diffusing (or scattering) element arranged at a border of the field of view of the illuminator and the diffusing element is scattering illumination light towards the secondary illumination region. The intensity distribution in the secondary illumination region may be configured to be homogeneous (i.e. having a flat profile) or the illumination power is configured to decrease in a direction towards the imager. The latter configuration has the advantage that the illumination power per angle can be reduced even further in critical regions closer to the imager, which can still provide sufficient illuminance power for sufficient and reliable image generation. Preferably, the diffusing element can be configured to provide a secondary illumination region with a specific tiered, Gaussian, or top hat pattern or profile by scattering illumination light towards that region, in particular illumination light from the primary illumination region.

Preferably, the secondary illumination region with the described partial power configurations can be illuminated by the diffusing element placed in a certain distance of the illuminator. Due to such spatial positioning, the vertical intensity profile (i.e. the size of the intermediate region) can be controlled in a very simple way by a fixed and stable component alignment. The distance between the diffusing element and the illuminator could also be adapted during use of the imaging system to actively control the size of the intermediate region.

In yet another aspect, the invention relates to a surround-view imaging system for imaging a surrounding of the system, comprising an imager having an image detector, an illuminator, and an illumination controller; wherein the illuminator is adapted to illuminate in a field of view of the illuminator the surrounding of the system such that illumination light that is reflected by the surrounding can be imaged by the imager in a field of view of the imager as imaging light; wherein the illumination controller is adapted to control a spatial distribution of illumination power depending on intensity values of the imaging light received by the image detector.

This aspect particularly addresses the problem of the risk of severe overexposure with a ToF or flash illumination when objects are near the illuminator. A mechanical solution as described above may not be sufficient or applicable due to the high intensity of the individual illumination pulses which would result in an unpractically large distance d between the illuminator and the imager and a disproportionally large "blind" intermediate region. Instead, the illumination intensity can be dynamically controlled, based on scene feedback, as measured and interpreted by algorithms, to reduce stray light, expand dynamic range and for other purposes to improve sensor performance. These techniques can also include an active control of the distance between the diffusing element and the illuminator as described above.

For direct ToF, illumination intensity can also be modulated, for example, by the illumination controller by increasing or decreasing pulse width, increasing or decreasing the pulse duration, increasing or decreasing the intensity of the pulse, and/or increasing or decreasing the number of pulses of individual illumination light sources. For indirect ToF, illumination intensity can be adjusted, for example, by adjusting the amplitude of the illumination wave or the duration of the illumination within the frame. For VCSELs as illumination light sources, changing the illumination intensity can be implemented with individual VCSELs, banks of VCSELs, or all VCSELs. Oher illumination light sources may be controlled similarly.

Scene feedback can be measured, for example, by monitoring a change in pixel intensity, change in a cluster of pixel intensity values, and/or the determination that a set illumination intensity threshold is exceeded. Intensity threshold values can be evaluated in either the image detector (e.g. system-on-chip, SOC) or on a host processor. Source intensity can be increased or decreased based on the approaches described above.

Monitoring pixel metrics such as intensity, cluster of pixel intensities, depth values or cluster of pixel depth values to control illumination intensity can be performed by monitoring:

a) absolute values or thresholds or a combination thereof,
b) rolling pixel averages from frame-to-frame, and
c) algorithm(s) combining individual or a combination of metrics.

Oftentimes, for the illumination of large horizontal fields of view or radial fields of view, more than one illumination light source (e.g. VCSELs, LEDs) is used. If saturation or overexposure of the associated image detector is caused by a single object in the surrounding, then it is beneficial to dim just the illumination sources illuminating the object and to maintain the full range of detection in the unobstructed regions in the field of view of the imager.

The use of controlled dimming reduces the noise from stray light occurring in a fisheye lens. This can improve the dynamic range of the sensor and reduce the amount of stray light or overexposure of the sensor. Fisheye lenses are susceptible to illumination "bouncing" around the lens, which creates noise. If too much illumination light enters the lens, the lens can in effect "blind" itself. The use of dimming reduces this potential. In this embodiment, changes in depth data values and intensity data values can be used to control dimming. In a pulse-based surround view imaging system, controlled dimming can be, for example, implemented through reducing the number of pulses, duration of pulses, and magnitude of pulses. Controlled dimming can also be applied by reducing the intensity of light for indirect ToF approaches.

Preferably, the control of the spatial distribution of illumination power is based on a parameter $I_\Delta$ exceeding a predefined threshold value, wherein the parameter $I_\Delta$ is defined as $$I_{\Delta(i,j)} = \sum_{l=1}^{p} C_l X_l,$$

wherein i, j denote individual pixels in the respective horizontal and vertical direction of the image detector (i and j are natural numbers), p is a natural number greater than 1 (preferably greater than 2), $C_l$ are predetermined coefficients and $X_l$ are differences between specific parameters corresponding to two successive frames of the image detector.

Feedback to the illumination controller is preferably provided by determining the parameter $I_\Delta$ for each pixel of the image detector in an array defined by the number of horizontal rows (i) and the number of vertical columns (j) to be noted as array (i, j) by looping through the array of size ($i_{max}$, $j_{max}$) to determine values for pixels from (0, 0) to ($i_{max}$, $j_{max}$).

Preferably, the number of summands in the sum is p=11, which means that 11 different parameters $X_l$ are used to determine the parameter $I_\Delta$. The $C_l$ are coefficients determined during testing, calibration, and characterization of the system. The coefficients $C_l$ are influenced by the illumination source, ambient light, image sensor, lens type, etc. The coefficients $C_l$ can be positive or negative real numbers which can vary between the different pixels of an image detector. One or more of the coefficients $C_l$ may be set to zero.

However, at least one of the coefficients $C_l$ has to be non-zero for at least one pixel which can be evaluated and which is relevant for imaging (a region of interest may reduce the number of relevant pixels compared to the total number of pixels of the image detector) when determining the parameter $I_\Delta$ according to the invention. Furthermore, a pixel array may include non-active or omitted regions which can then be assumed to be comprised of virtual pixels which are not relevant for imaging. In other words, for any type of image detector which can be at least principally described as an ($i_{max}$, $j_{max}$)-sized array (even though there are pixel areas left out or omitted for imaging), parameters $I_\Delta$ for the relevant pixels can be determined and used for the control of the spatial distribution of illumination power with this scheme. The individual pixels can have different sizes or a non-squarish shape (i.e. differ from a uniform array arrangement) as long as a grid structure can be defined as a unique ($i_{max}$, $j_{max}$)-sized array allowing to unambiguously address each of these pixels.

The definition of the preferred 11 parameters $X_l$ for a pixel (i, j) of an ($i_{max}$, $j_{max}$)-sized pixel array can be defined as follows (frame number n, pixel distance m):

$$1 = 1:\ X_1 = \text{Intensity Value of Pixel}_{(i,j)Frame(n+1)} - \text{Intensity Value of Pixel}_{(i,j)Frame(n)}$$

$$1 = 2:\ X_2 = \text{Depth Value of Pixel}_{(i,j)Frame(n+1)} - \text{Depth Value of Pixel}_{(i,j)Frame(n)}$$

$$1 = 3:\ X_3 = \text{Average of Neighboring Intensity Values}_{(i,j)Frame(n+1)} - \text{Average of Neighboring Intensity Values}_{(i,j)Frame(n)}$$

$$\text{as } \frac{\sum_{j-m}^{j+m}\sum_{i-m}^{i+m}\text{Intensity Value}_{(i,j)}}{2m+1}_{Frame(n+1)} - \frac{\sum_{j-m}^{j+m}\sum_{i-m}^{i+m}\text{Intensity Value}_{(i,j)}}{2m+1}_{Frame(n)}\ m = 0, 1, 2, 3, 4, \text{ or } 5 \text{ pixels}$$

$$1 = 4:\ X_4 = \text{Average of Neighboring Depth Values}_{(i,j)Frame(n+1)} -$$

-continued $$\text{Average of Neighboring Depth Values}_{(i,j)Frame(n)}$$

$$\text{as } \frac{\sum_{j-m}^{j+m}\sum_{i-m}^{i+m}\text{Intensity Value}_{(i,j)}}{2m+1}_{Frame(n+1)} - \frac{\sum_{j-m}^{j+m}\sum_{i-m}^{i+m}\text{Intensity Value}_{(i,j)}}{2m+1}_{Frame(n)}\ m = 0, 1, 2, 3, 4, \text{ or } 5 \text{ pixels}$$

$$1 = 5:\ X_5 = \text{Rate of Change of Intensity Values For Pixel}_{(i,j)} = \ldots = \Delta_{(i,j)Frame(n)-Frame(n-1)} - \Delta_{(i,j)Frame(n-1)-Frame(n-2)},$$

$$\text{where } \Delta_{(i,j)Frame(n+1)-Frame(n)} = \ldots = \text{Intensity Value of Pixel}_{(i,j)Frame(n+1)} - \text{Intensity Value of Pixel}_{(i,j)Frame(n)}$$

$$1 = 6:\ X_6 = \text{Rate of Change of Depth Values For Pixel}_{(i,j)} = \ldots = \Delta_{(i,j)Frame(n)-Frame(n-1)} - \Delta_{(i,j)Frame(n-1)-Frame(n-2)},$$

$$\text{where } \Delta_{(i,j)Frame(n+1)-Frame(n)} = \ldots = \text{Depth Value of Pixel}_{(i,j)Frame(n+1)} - \text{Depth Value of Pixel}_{(i,j)Frame(n)}$$

$$1 = 7:\ X_7 = \text{Rate of Change of Average Neighboring Intensity Values for Pixel}_{(i,j)} = \Delta_{(i,j)Frame(n)-Frame(n-1)} - \Delta_{(i,j)Frame(n-1)-Frame(n-2)},$$

$$\text{where } \Delta_{(i,j)Frame(n+1)-Frame(n)} = \text{Average of Neighboring Intensity Values}_{(i,j)Frame(n+1)} - \text{Average of Neighboring Intensity Values}_{(i,j)Frame(n)}$$

$$\text{as } \frac{\sum_{j-m}^{j+m}\sum_{i-m}^{i+m}\text{Intensity Value}_{(i,j)}}{2m+1}_{Frame(n+1)} - \frac{\sum_{j-m}^{j+m}\sum_{i-m}^{i+m}\text{Intensity Value}_{(i,j)}}{2m+1}_{Frame(n)}\ m = 0, 1, 2, 3, 4, \text{ or } 5 \text{ pixels}$$

$$1 = 8:\ X_8 = \text{Rate of Change of Average Neighboring Depth Values for Pixel}_{(i,j)} = \ldots = \Delta_{(i,j)Frame(n)-Frame(n-1)} - \Delta_{(i,j)Frame(n-1)-Frame(n-2)},$$

$$\text{where } \Delta_{(i,j)Frame(n+1)-Frame(n)} = \text{Average of Neighboring Depth Values}_{(i,j)Frame(n+1)} - \text{Average of Neighboring Depth Values}_{(i,j)Frame(n)}$$

$$\text{as } \frac{\sum_{j-m}^{j+m}\sum_{i-m}^{i+m}\text{Intensity Value}_{(i,j)}}{2m+1}_{Frame(n+1)} - \frac{\sum_{j-m}^{j+m}\sum_{i-m}^{i+m}\text{Intensity Value}_{(i,j)}}{2m+1}_{Frame(n)}\ m = 0, 1, 2, 3, 4, \text{ or } 5 \text{ pixels}$$

$$1 = 9:\ X_9 = \{0, 1\} \text{ if Intensity Value of Pixel}_{(i,j)Frame(n)} > \text{Maximum Defined Intensity Threshold}$$

$$1 = 10:\ X_{10} = \{0, 1\} \text{ if Depth Value of Pixel}_{(i,j)Frame(n)} < \text{Minimum Defined Depth Threshold}$$

$$1 = 11:\ X_{11} = \Delta \text{ in Ambient Light Sensor} = \ldots = \text{Ambient Light Value}_{Frame(n+1)} - \text{Ambient Light Value}_{Frame(n)}$$

In these definitions, the occurring marginal values in relation to a first frame 0 (or 1) or neighboring pixels (cf. FIG. 5*a*) which would be located outside the dimensions of the array have to be considered with reasonable adjustments. For those pixels that would cause problems in the determination of a parameter $I_\Delta$, the related components $C_l$ can preferably set to be zero to avoid the resulting indefiniteness of the components $C_l$. That means that with the parameter $I_\Delta$ for the different relevant pixels, also the threshold value to be compared may be defined per pixel. However, for simplification, also a global threshold value can be defined. This global threshold may be compared with the sum of all evaluated parameter $I_\Delta$ for relevant pixels of the detector array.

Preferably, following the determination of the parameter $I_\Delta$ for relevant pixels of the detector array, an algorithm may loop through the pixels in a specific illumination region of the image detector, counting the number of pixels in said region which exceed a defined threshold necessary to reduce the illumination or increase the illumination.

Tuning the counter and the different thresholds is specific to the lens and the image detector of an imager, and the illumination source in combination. Also the application of the imaging system and the applied platform (i.e. a robot, drone or vehicle for example) has to be considered in determining the threshold values. For example, an imaging system on a moving AMR will need to include the speed and travel distance of the robot in the depth calculations. The distance traveled by the robot can be determined through sensors, encoders, etc. The change in distance of an object from the sensor needs to include the combination of the change in distance of the robot and the change in distance of an object (cf. FIG. 5*b*).

The aim is to eliminate any risk of saturation or stray light created by an object that is within a specific distance threshold from the imaging system. The magnitude of a required change in the intensity of the illumination sources can be determined by characterizing the imaging system. In some embodiments, the illumination controller may be limited to a finite number of steps or settings. As a result, a lookup table can be created; aligning appropriate settings for specific parameters $I_\Delta$ determined for an illumination region of the image detector (cf. FIG. 5*c*).

In yet another aspect, the invention relates to a surround-view imaging system for imaging a surrounding of the system, comprising an imager, an illuminator, and an illumination controller; wherein the illuminator is adapted to illuminate in a field of view of the illuminator the surrounding of the system such that illumination light that is reflected by the surrounding can be imaged by the imager in a field of view of the imager as imaging light; wherein the illumination controller is adapted to control a spatial distribution of illumination power from the illuminator depending on an actual and/or prospected motion profile of the system.

An actual motion profile is to be understood as a combination of all relevant movements the imaging system actually performs. This movements can be defined absolutely (e.g. via GPS) or relatively (e.g. via predefined boundaries for the working area of a robot) and may include traveling in all three axes, a rotation of the system or, for example, an tilting, translating or rotating one of the components of a robot (e.g. an arm or gripper temporarily moving in a field of view of the imaging system). Since the illumination controller can use this information, the illumination can be directed or limited to avoid any unnecessary or disadvantageous light emission from the illuminator. This may be particularly interesting in cases where a field of view temporarily includes a part of a robot or machine which may cause strong light scattering or reflections which could saturate or overexpose an associated image detector.

When the illumination controller uses known or detected information about the surrounding, they can also be used in combination with an actual motion profile. If a field of view includes an object or surface which may cause strong light scattering or reflections which could saturate or overexpose an associated image detector, then the illumination directed towards these obstacles may be redirected, reduced or completely suppressed. For example, during operation, it is very likely that AMR will navigate along walls, shelving, and/or into corners. The proximity to the walls, shelves, or objects increases the likelihood of overexposure. To prevent saturation and overexposure, dimming at least some of the illumination sources in a progressive pattern may be applied.

The use of controlled dimming reduces the noise from stray light evident in a fisheye lens. This can improve the dynamic range of the sensor and reduce the amount of stray light or overexposure of the sensor. Fisheye lenses are susceptible to illumination "bouncing" around the lens which creates noise. If too much illumination light enters the lens, the lens can in effect "blind" itself. The use of dimming reduces this potential. In a pulse-based surround view imaging system, controlled dimming can be, for example, implemented through reducing the number of pulses, duration of pulses, and magnitude of pulses. Controlled dimming can also be applied by reducing the intensity of light for indirect ToF approaches.

In contrast to an actual motion profile, a prospected motion profile predicts future movements of the system. This information can be, for example, based on extrapolation from an actual motion profiles or derived from a predefined route or travel path. By using a prospected motion profile for illumination control, the system response can be faster and any saturation or overexposure of an associated image detector can be avoided already in advance (predictive saturation avoidance, PSA).

Preferably, the illuminator comprises circumferentially arranged illumination light sources, wherein the illumination light sources are electrically and mechanically connected to a related illumination board by a pivoting or moving bracket or holder.

The idea of this embodiment is that the individual light sources (or any related light shaping/directing devices) can be mounted to a pivoting or moving bracket or holder on the illumination board. This allows to mechanically control the angle or position of the light sources and the light shaping/directing devices in order to achieve a required light distribution. This can, for example, be done dynamically in response to real-time scene information or based on an actual and/or prospected motion profile of the system. The illumination light sources (e.g. VCSELs, LEDs) can thus be controlled in their emission direction, which can be considered as a kind of directional intensity control.

A preferred embodiment for such a mechanically controllable light source alignment is a rigid-flex illumination board, where the light sources are attached by flexible cables that can be rotated or translated into position, either during a production process of the illumination board or later in real-time during use of the imaging system.

Preferably, an angle between the illumination light sources and the illumination board is actively controlled by actuators. The actuators can be controlled by the illumination controller. The angle can thus be dynamically changed and the field of vision of the illuminator can be adapted in use. This has the advantage that the individual illumination light sources can be mechanically dimmed and intensity controlled with respect to a specific illumination direction. This technique can be useful for illumination light sources in which the optical properties of the emitted light (e.g. wavelength, phase, spectral linewidth) depend on the intensity of the emitted light such that electronic intensity control cannot be applied.

In yet another aspect, the invention relates to a surround-view imaging system for imaging a surrounding of the system, comprising an imager having an image detector and a detection controller, and an illuminator; wherein the illuminator is adapted to illuminate in a field of view of the illuminator the surrounding of the system such that illumination light that is reflected by the surrounding can be imaged by the imager in a field of view of the imager as imaging light; wherein the detection controller increases the frame rates of the image detector by limiting the readout of the image detector to a region of interest, ROI, wherein the definition of the ROI is based on an actual and/or prospected motion profile of the system.

The detection controller is thus configured to allow, in combination with a corresponding image detector, limiting the readout of the image detector to specific regions, wherein this limiting allows the image detector to ignore pixels outside the ROI during readout. The detection controller thus controls the readout process of the image detector. According to the invention, the image detector must consequently be configured to allow increased frame rates during such pixel-limited readout processes, which means that some regions or pixels of the image detector are neglected during readout. As already discussed above in relation to an active detection region corresponding to image size, higher frame rates reduce the accumulation of optically induced charge carriers in the individual pixels of a detector. Saturation and overexposure can thus be avoided and the SNR of the detector can be increased for optimal image detection over a wide dynamic range. Multiple ROI can also be selected on an image detector during frame capturing. ROIs can in particular be defined by selecting rows, selecting columns, or selecting partial rows and columns of an image detector.

The idea behind analyzing an actual and/or prospected motion profile of the system was already discussed above in relation to the dynamic illumination of the surrounding. Reference is made to the relevant paragraphs. However, analyzing an actual and/or prospected motion profile allows in particular determining the direction of travel of, for example, an AMR. With an AMR (e.g. cleaner robot), the imaging of the surrounding can be reduced to a field of vision that is essentially defined by the direction of travel, since, in contrast to an autonomous vehicle in public, all other directions can be neglected without major loss of safety. Therefore, it is preferred that the definition of the ROI is based on an actual and/or prospected direction of travel such that the surrounding is essentially only imaged in a small field of vision around that direction of travel. This field of vision can have a horizontal extent of preferably less than 5 degrees and more preferably less than 1 degree.

Another advantage of defining a ROI and dynamically limiting the field of vision of the system is that the maximum operational speed of an AMR, AGV or other moving platform depends on many factors (stopping distance, sensor range, depth sensor performance, weight of vehicle, environmental conditions, etc.). The performance of the depth sensor, as measured by latency and frame rate, influences the speed of these devices in the direction of travel. The faster the frame rate, the faster scene information can be delivered to the devices.

Preferably, the system further comprises an illumination controller, wherein the illumination controller is adapted to control a spatial distribution of illumination power to avoid that reflected illumination light is received by regions of the image detector which are out of the ROI. This feature is directly related to the above discussed dynamic illumination and combines diming (or off-switching) of illumination sources with the selection of a single ROI or multiple ROIs. Reference is made to the relevant paragraphs. The combination of a selective illumination with a selective readout of the image detector reduces the overall intensity of the emitted illumination light and increases the possible frame rates at the same time.

In addition to improved environmental performance based on energy savings and the avoidance of unnecessary light pollution that can disrupt other systems, this also means that less illumination light can be scattered in the in- and outside of the system, which reduces saturation and overexposure of the associated image detector by avoiding any accidental reflections and by reducing the accumulation of optically induced charge carriers to lower the maximum intensity received by the individual pixels per frame. At higher frame rates, a possible carrier leakage between neighboring pixels with strongly varying number of charge carriers is also reduced, which in turn increases the SNR of the imaging detector.

Further preferred embodiments of the invention result from features mentioned in the dependent claims.

The various embodiments and aspects of the invention mentioned in this application can be combined with each other to advantage, unless otherwise specified in the particular case.

BRIEF DESCRIPTION OF THE DRAWINGS

In the following, the invention will be described in further detail by figures. The examples given are adapted to describe the invention. The figures show.

DETAILED DESCRIPTION

Figure 1:
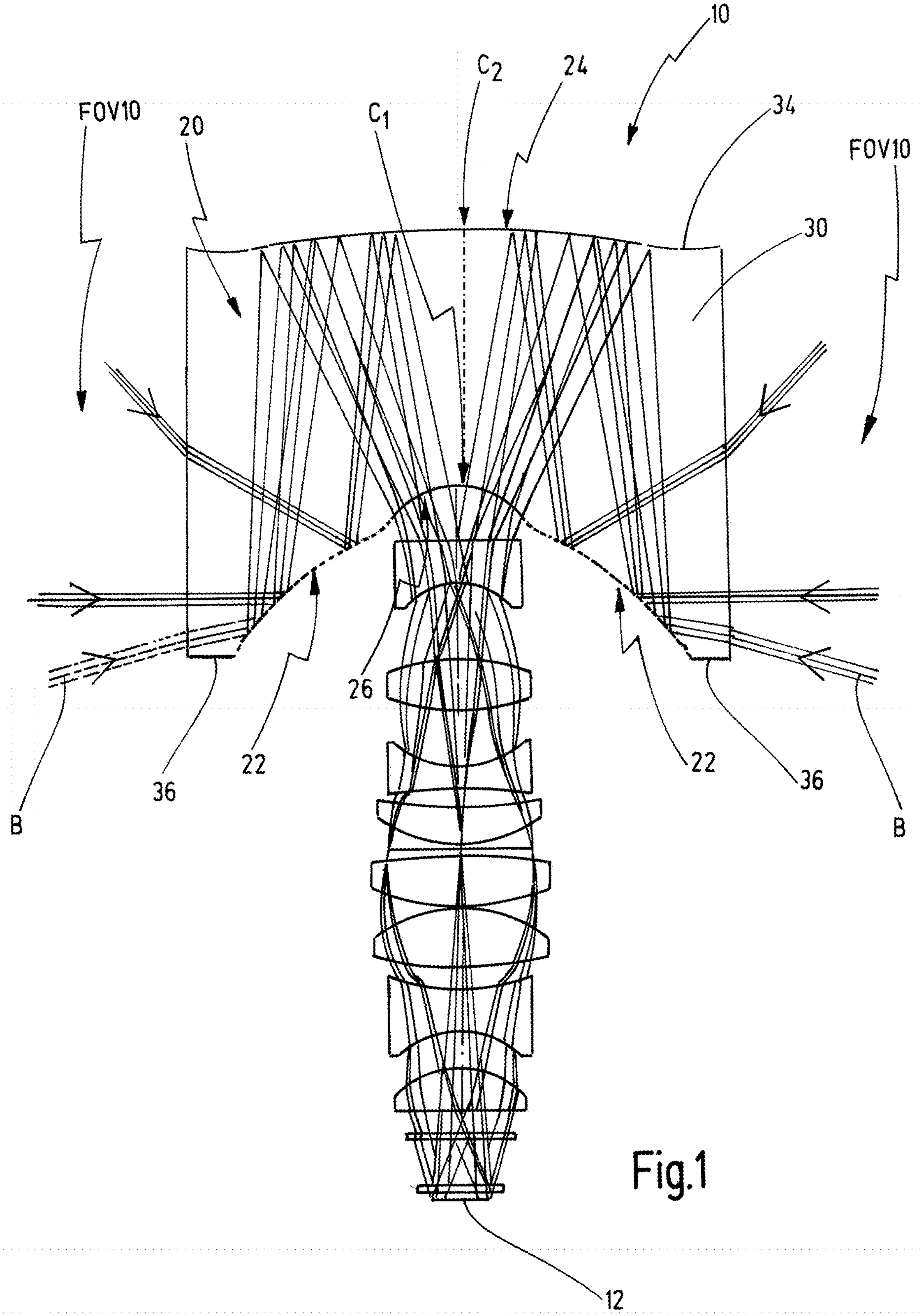
FIG. 1 a schematic illustration of an embodiment of an imager according to the invention.
Figure 2B:
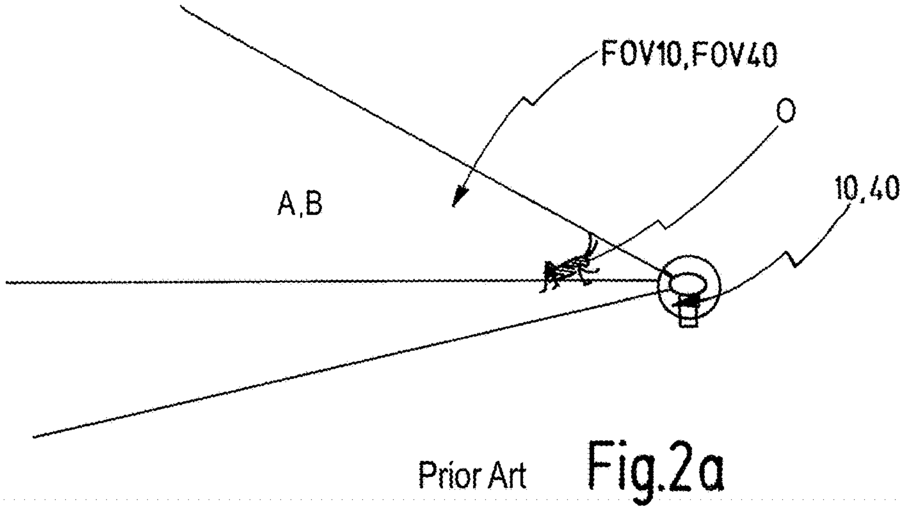
FIG. 2 a schematic illustration of a) a prior art surround view imaging system and b) to d) different embodiments of a surround view imaging system according to the invention.
Figure 2B:
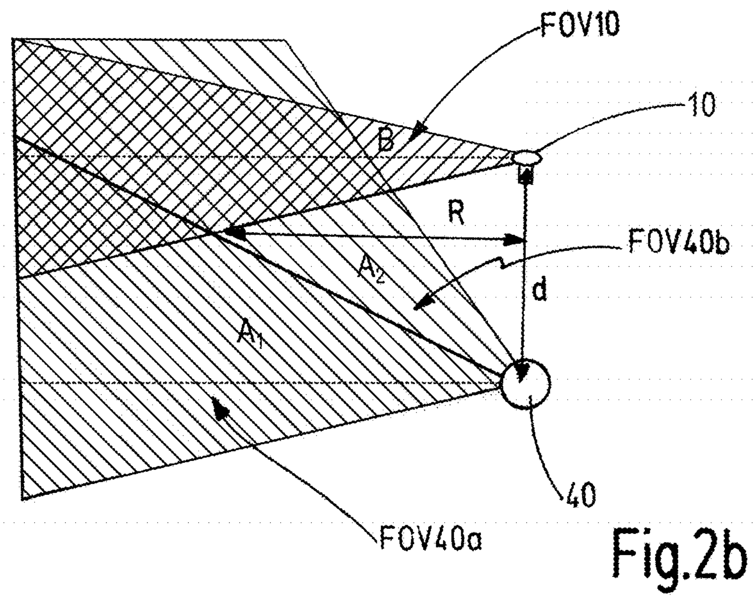
Figure 2C:
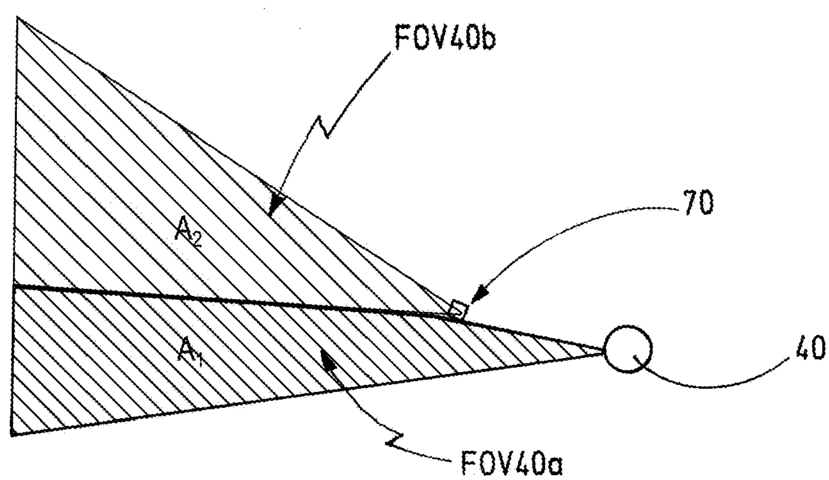
Figure 2D:
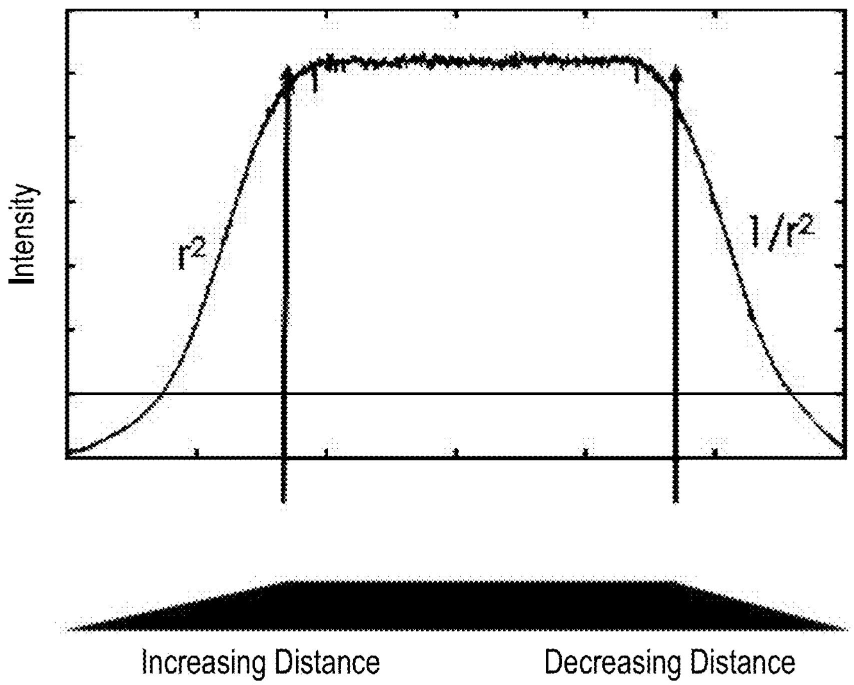

FIG. 1 shows a schematic illustration of an embodiment of an imager 10 according to the invention. The imager comprises an image detector 12 and a cylindrically shaped monolithic catadioptric lens 20 having a corpus 30 with a mantle 32, a top surface 34 and a bottom surface 36; wherein in a field of view of the imager FOV10 imaging light B from a surrounding of the imager 10 enters the corpus 30 by the mantle 32, is firstly reflected by a circumferential first aspheric lens region 22 arranged around a center C1 of the bottom surface 36, is secondly reflected by a second aspheric lens region 24 arranged at a center C2 of the top surface 34, and leaves the corpus 30 towards the image detector 12 by a third aspheric lens region 26 at the center C1 of the bottom surface 36.

Further, a lens stack is exemplarily shown between the catadioptric lens 20 and the image detector 12. In particular, the shown lens stack comprises eight spherical lenses for further image projection. As the shown monolithic lens 20 comprises three aspherical surfaces, the rest of the optical system can be managed with standard spherical lenses only, while still ensuring a good optical performance (i.e., MTF, distortion, etc.) at moderate costs. The imager 10 can further include a bandpass filter, which can be preferably arranged between the lens stack and the image detector 12. An additional bandpass filter can cut off spectral components of the illumination light which are not relevant for image generation or which would otherwise lead to saturation and overexposure of the image detector 12.

A catadioptric lens 20 according to the invention thus comprises four optically active surfaces on which imaging light B becomes redirected while propagating through the corpus 30 of the monolith. The mantle 32 and the third aspheric lens region 26 are transparent for the imaging light B. At these surfaces, imaging light is redirected by diffraction when the refractive index of the catadioptric lens 20 differs from the refractive index of the surrounding. Preferably, the catadioptric lens 20 is made from a plastic optics material with high refractive index (transparent in the relevant spectral range of the imaging light B) like acrylic, polystyrene, polycarbonate, cyclic olefin polymer (COP) or composites made from these materials. However, any optics material which is transparent in the relevant spectral range of the imaging light B can be used.

At the first aspheric lens region 22 and second aspheric lens region 24, the imaging light B is redirected by reflection. This means that at these regions the respective surfaces of the corpus 30 serve as mirrors for the incident imaging light B. Preferably, the mirrors can be produced by coating the corresponding surfaces with a metal or dielectric layer (mirrored surfaces). A dielectric layer may be a dielectric stack designed to provide high reflection in the relevant spectral range of the imaging light B. In some embodiments, the first aspheric lens region 22 and/or the second aspheric lens region 24 may be formed to reflect the imaging light B by total internal reflection (TIR). While TIR reduces the optical losses in reflection in order to detect even very weak imaging light B, the use of reflective surfaces generally prevents the occurrence of scattered light in the catadioptric lens 20, which could accidentally enter subsequent sections of the imager 10. In other words, the catadioptric lens 20 is designed as a stable and compact optical component, which is cheap and easy to produce and which reduces the risk of saturation and overexposure of an associated image detector 12 by avoiding the occurrence of stray light inside the catadioptric lens 20.

FIG. 2 shows a schematic illustration of a) a prior art surround view imaging system and b) to d) different embodiments of a surround view imaging system according to the invention. In a prior art surround view imaging system according to a), the illuminator 40 and the imager 10 typically share a common field of view FOV10, FOV 40, which means that illumination light A is emitted by the illuminator 40 into the same solid angle range from which the illumination light B is imaged by the imager 10. If a reflective object O is in close proximity to the imaging system, strong overexposure and multipath illumination may occur, since the illumination power density decreases with the distance square from the source. This overexposure at certain pixels can even saturate neighboring pixels of the image detector 12 or bring misdirected light to neighboring. This would result in incorrect distance information from the sensor system.

The problem of such overexposure can be avoided in a surround view imaging system by arranging the illuminator 40 and the imager 10 one over another and separated from one another by a distance d to form an intermediate region R which is neither in the field of view of the illuminator FOV40 nor in the field of view of the imager FOV10. In this case, the field of view of the illuminator FOV40 differs from the field of view of the imager FOV10, which means that illumination light A is emitted by the illuminator 40 into a solid angle range which differs from a solid angle range from which the illumination light B is imaged by the imager 10. However, with this approach the imaging system has a large intermediate region R in which the surrounding cannot be imaged anymore.

As shown under b), this drawback can be reduced when the field of view of the illuminator FOV40 comprises a primary illumination region FOV40*a* with high maximum illumination power (first illumination light $A_1$) and a secondary illumination region FOV40*b* arranged between the primary illumination region FOV40*a* and the imager 10 with lower maximum illumination power (second illumination light $A_2$). The secondary illumination region FOV40*b* may be used to reduce the volume of the "blind" intermediate region R which is formed because of the distance d between the illuminator 40 and the imager 10. In fact, the secondary illumination region FOV40*b* can even fill a rather large part of the intermediate region R, but due to their lower maximum illumination power the problem of saturation and overexposure of the image detector 12 can still be reduced compared to an illumination with common high maximum illumination power in both illumination regions FOV40*a*, FOV40*b*. Therefore, the idea of this embodiment is that in imaging regions which are particularly vulnerable to saturation and overexposure of an associated image detector 12, the illumination power is reduced compared to other regions in which the fields of view from the illuminator 40 and the imager 12 are overlapping.

In the embodiment shown under c), the secondary illumination region FOV40*b* is formed by a diffusing element 70 arranged at a border of the field of view of the illuminator FOV40. The diffusing element 70 scatters first illumination light $A_1$ towards the secondary illumination region FOV40*b*, which then becomes second illumination light $A_2$. The intensity distribution in the secondary illumination region FOV40*b* may be configured to be homogeneous (i.e. having a flat profile) or the illumination power is configured to decrease with angles towards the imager 10. This configuration has the advantage that the illumination power per angle can be reduced even further in critical regions closer to the imager 10, which can still provide sufficient illuminance power for sufficient and reliable image generation.

The difference between the two embodiments shown under b) and c) is that in the first embodiment, the primary illumination region FOV40*a* and the secondary illumination region FOV40*b* are both parts of an original common field of view of the illuminator FOV40, while in the second embodiment, the second illumination region FOV40*b* is split off from the primary illumination region FOV40*a* of an illuminator 40 by a diffusing element 70. Using a diffusing element 70 to generate a second illumination region FOV40*b* has the advantage that illuminators 40 with a relatively low maximum or minimum field of view can be used without any adaption required. An illuminator 40 which provides a primary illumination region FOV40*a* and a secondary illumination region FOV40*b* directly must be specifically designed for such applications and is thus more expensive as using a single diffusing element 70. The secondary illumination region FOV40*b* with the described partial power configurations can be illuminated by the diffusing element 70 placed in a certain distance from the illuminator 40. Due to such spatial positioning, the vertical intensity profile (i.e. the size of the intermediate region) can be controlled in a very simple way by a fixed and stable component alignment.

Under d) a specific embodiment of a diffusing element 70 and the intensity distribution in the resulting combined illumination region is shown. In general two or more illumination regions can be defined to reduce potential sources of noise or to improve power efficiency. Therefore, also a tertiary illumination region may be split off from the primary illumination region FOV40*a* of an illuminator 40 by a common diffusing element 70 or one or more separate diffusing elements. While in a primary illumination region FOV40*a* a high intensity region with a top hat profile may be provided, the illumination profile in a secondary illumination region FOV40*b* and a tertiary illumination region may be different from a top profile. The type of profiles can depend on the specific configuration and arrangement of the surround view imaging system. In particular, a constant illumination in the tertiary illumination region can be created by increasing the slope intensity by $r^2$, which offsets the decrease in illumination by $1/r^2$. The intensity distribution can also be graded within an illumination region. A certain gradation can be used to include the influence of noise received at large angles.

In some embodiments the tertiary illumination region may be directed to a ground floor, corners or edges for example. The photons can then bounce off at the floor before hitting an object and returning to the sensor. However, only direct photons can be used for imaging. The inclusion of the bounced photons, defined as multi-path noise, contribute to an incorrect distance reading. Reducing the illumination in regions of the FOV which are critical to multi-path noise also reduces the impact of multi-path reflections. Furthermore, saturation and overexposure of an associated image detector resulting from these reflections at the floor can be avoided. An exemplary embodiment of a respective common diffusing element 70 is shown as a double wedge structure with a central planar transmission region. For a surround view imaging system this structure may be arranged around the full horizontal FOV as a circular ring.

Figure 3A:
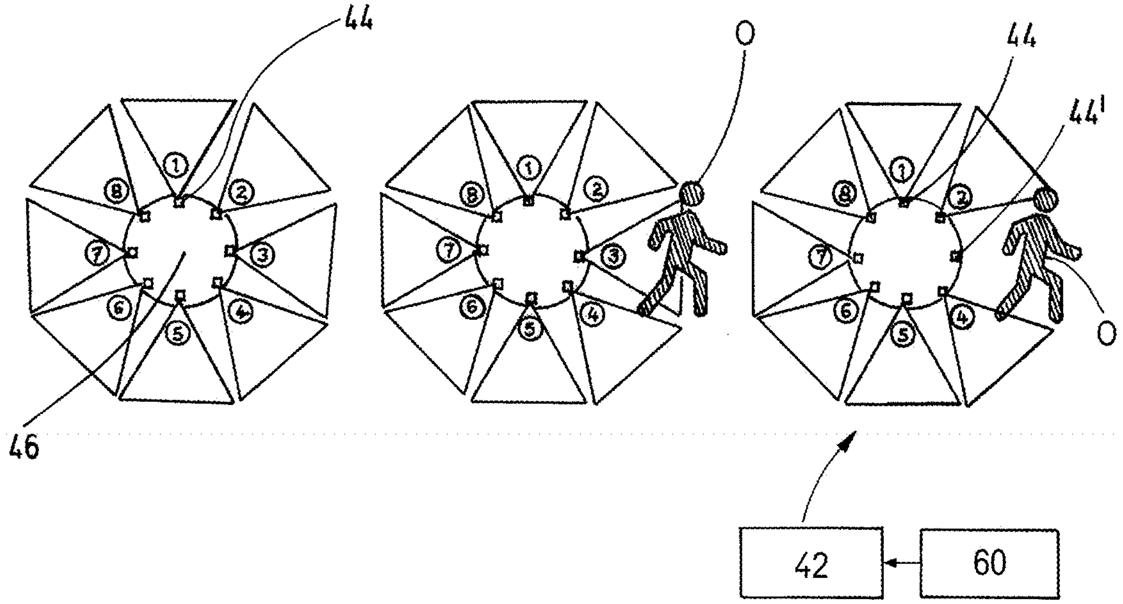
FIG. 3 schematic illustrations of controlling a spatial distribution of illumination power depending on intensity values of imaging light received by an image detector according to the invention.
Figure 3B:
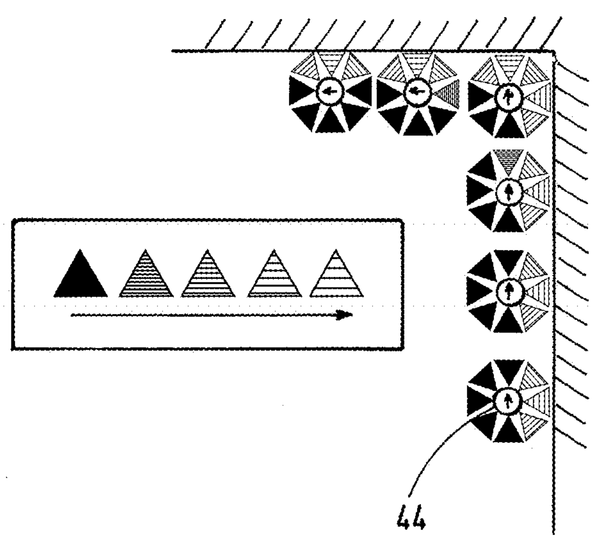

FIG. 3 shows schematic illustrations of controlling a spatial distribution of illumination power depending on intensity values of imaging light B received by an image detector 12 according to the invention. Under a) a top-down view of an illuminator 40 is shown, which comprises 8 circularly arranged VCSELs as illumination light sources 44. They are mounted to a common illumination board 46 in a pattern to allow a horizontal 360 degrees illumination. When an object O (like a person or an insect) comes into proximity of the illuminator 40, saturation and overexposure of an associated image detector 12 can occur. However, before the intensity values of the imaging light B received by the image detector 12 reach a critical value, which can be evaluated by a detection controller 60, the spatial distribution of illumination power may be adapted to the current situation by an illumination controller 42. If the detection controller 60 detects a beginning saturation of the image detector 12, the detection controller 60 can interact with the illumination controller 42 to modify the spatial distribution of illumination power. In particular, one or more illumination light sources 44 may be dimed or turned off according to the object's O reflection. In the figure, the third VCSEL is exemplarily deactivated such that no reflection can be detected by the imager 10.

Under b) the illuminator 40 works quite similar and may have the same structure as presented above. In this case, a surround-view imaging system exemplarily moves up along a right wall, reaches an adjoining wall, rotates 90 degrees, and moves finally along the adjoining wall. The illumination sources 44' closest to the walls may be dimmed according to the reflection of the object O to avoid saturation and overexposure of the image detector 12. The corresponding illumination sources 44' can also be switched off completely. However, dimming the illumination sources 44' to provide a partial illumination in regions near the walls may be used to avoid "blind" spots. For dimming, the intensity of illumination light A emitted by the illuminator 40 can be gradually controlled by a corresponding algorithm of the illumination controller 42.

Figure 4A:
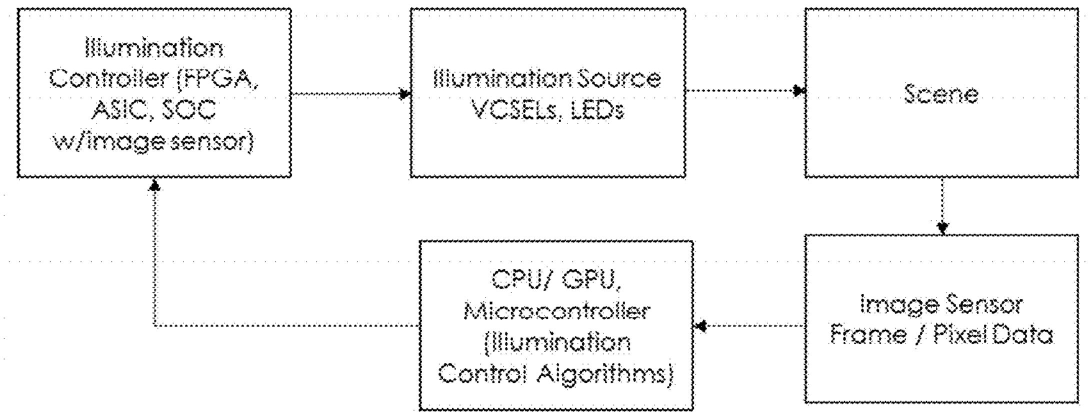
FIG. 4 schematic illustrations of different embodiments of an illumination control scheme according to the invention.
Figure 4B:
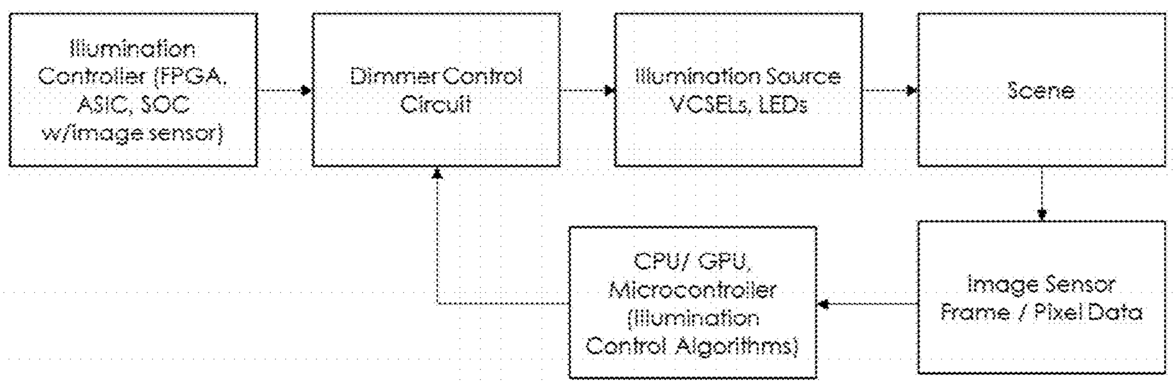
Figure 4C:
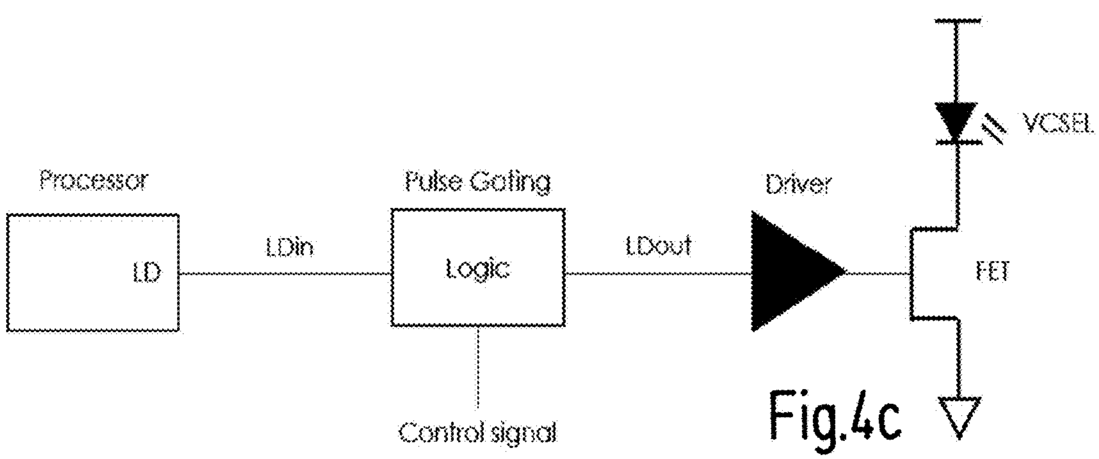

FIG. 4 shows schematic illustrations of different embodiments of an illumination control scheme according to the invention. Under a) and b) different algorithms for a closed loop illumination control architecture based on objects in the surrounding of the imaging systems are presented, wherein a) shows a direct feedback by an illumination controller circuit of an illumination controller 42 and b) shows a feedback by an additional dimmer control circuit (which is considered to be seen as an add-on component of a respective illumination controller circuit, wherein both circuits are considered to form an illumination controller 42 according to the invention). An external dimmer control circuit may be required in some implementations of the invention because not all illumination controller circuits have the capacity to control the intensity, duration, number, etc. of the pulses (e.g. VCSELs, LEDs).

The illumination controller 42 can send control signals to the individual illumination light sources 44 to initiate pulses or waveforms. The illumination light sources 44 (also called transmitters) illuminate the surrounding (also called scene or environment) and the signals returned by reflection are captured by the imager 10 (also called receiver) via the image detector 12. Raw pixel information is transferred to a depth controller for determining depth values of objects in the surrounding. The depth information is then sent to a processing unit in the surround view imaging system or to an external processing unit (e.g. CPU, GPU, FPGA, ASIC), where the algorithms can be processed. Feedback from the algorithms is then sent directly to an original illumination controller 42 or to an extended illumination controller 42 comprising a dimmer control circuit depending on the architecture of the image detector 12 and the illumination controller circuit. Either of these implementations then adjusts the intensity, duration, etc. of the individual illumination sources 44 (e.g. VCSELs, LEDs).

Under c) an exemplarily dimmer control circuit which can be used to control VCSEL illumination (LD stands for laser diode) is shown. A laser diode driver pulse gating circuit can modify the number of pulses to the driver and control a field-effect transistor (FET) via a control signal to control the light output of a VCSEL as an illumination light source 44. Preferably, an AND-gate is used to gate or block some of the pulses going to the driver to reduce the amount of VCSEL illumination on the scene. Inputs to the AND-gate may originate from the laser driver and the illumination controller circuit (control signal).

Figure 5A:
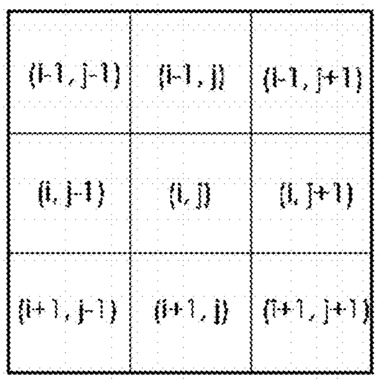
FIG. 5 schematic illustrations of methods of illumination controllers according to the invention.
Figure 5B:
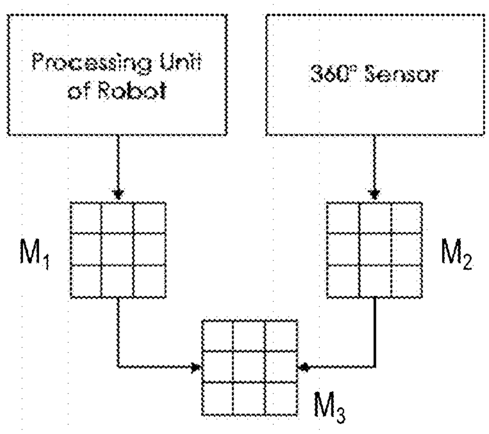
Figure 5C:
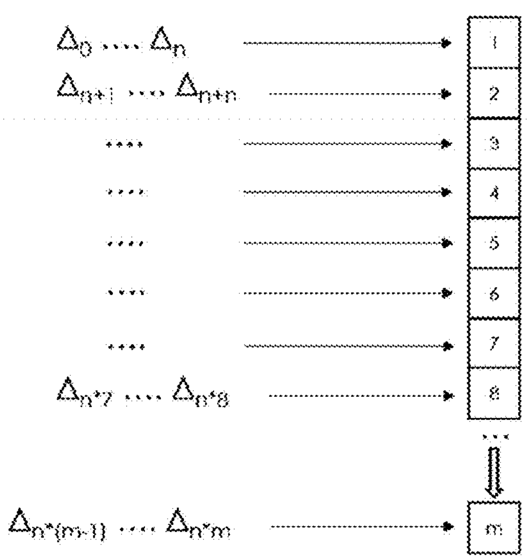

FIG. 5 shows schematic illustrations of methods used by an illumination controller according to the invention. Under a) the averaging of neighboring values of pixels around pixel (i, j) in a pixel array of size ($i_{max}$, $j_{max}$) with pixel distance m=1 is illustrated. The variable i refers to a number of horizontal rows and the variable j refers to a number of vertical columns in the array. At the edges of the array, corresponding neighboring values may be set to zero or have to be considered with reasonable adjustments. Preferably, the averaging of neighboring values may be completely omitted for pixels which do not have the required number of neighboring pixels for averaging around them.

Under b) determining a depth matrix from a distance matrix and a 360° sensor depth matrix is shown. The processing unit of, for example, an AMR or AGV can provide a matrix of distance values travelled during a frame (time frame). On the other hand, the surround view imaging system can provide a matrix of depth values for the corresponding frame. Both matrices can then be merged to result in a matrix of depth values determined from the surround view imaging system and the processing unit. This matrix can then be used as input for an illumination controller, which is adapted to control a spatial distribution of illumination power from the illuminator depending on intensity values of the imaging light received by the image detector and on an actual and/or prospected motion profile of the system. However, from an actual and/or prospected motion profile of the system further control data can be derived. Beside distance values travelled during a frame, these control data may also include already known distances to fixed or notified objects (like nearby walls and obstacles in predefined paths of an AMR or AGV, object notification beacons, etc.).

Under c) the alignment of the parameter $I_\Delta$ with corresponding illumination control settings is illustrated. The priority is to eliminate any risk of saturation or stray light created by an object that is within a specific distance from the surround view imaging system. The amount of change to the illumination source has to be determined through characterization of the system under different conditions. In some implementations, the illumination control may be limited to a finite number of steps or settings. As a result, a lookup table may be created that aligns appropriate settings for the specific parameters $I_\Delta$ determined for an illumination region. In the illustration, m different control setting are defined by specific threshold values for the parameters $I_\Delta$, wherein the selected illumination control setting depends on the specific value of a parameter $I_\Delta$. As the parameters $I_\Delta$ are pixel-based, the selected illumination control setting has to be configured to specifically control the illumination of that region of the surrounding which is related to the pixels from which the parameter $I_\Delta$ is derived. The shown illumination control settings may thus be applied for each parameter $I_\Delta$ for relevant pixels (i, j).

Figure 6A:
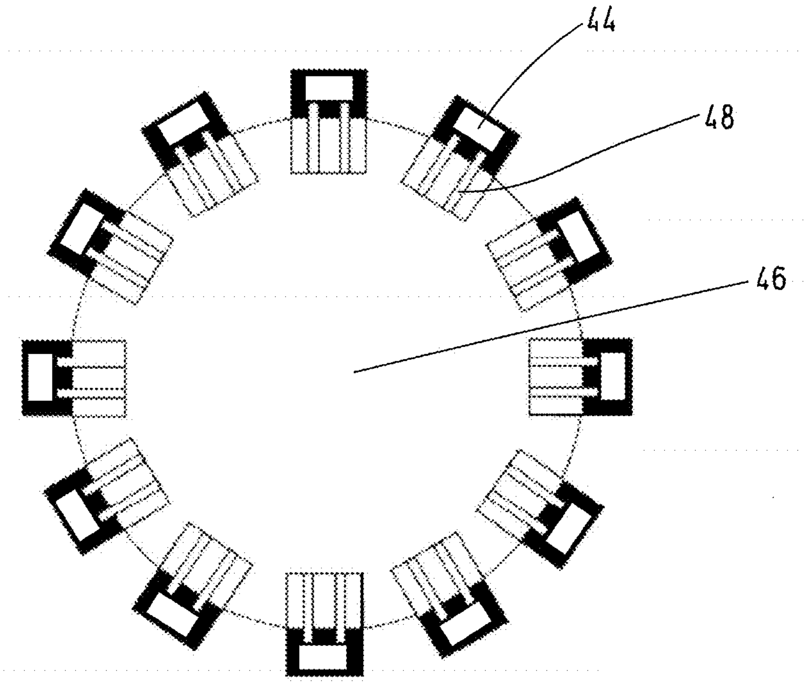
FIG. 6 a schematic illustration of an illuminator according to the invention.
Figure 6B:
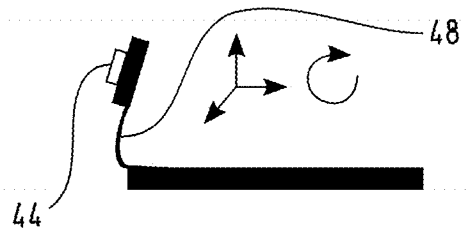
Figure 6C:
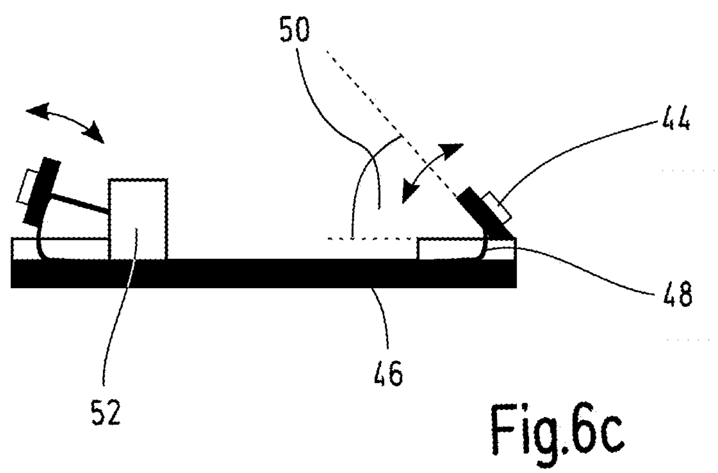

FIG. 6 shows a schematic illustration of an illuminator 40 according to the invention. The illuminator 40 comprises circumferentially arranged illumination light sources 44, wherein the illumination light sources 44 are electrically and mechanically connected to a related illumination board 46 by a pivoting or moving bracket or holder. This allows to mechanically control the angle or position of the illumination light sources 44 and light shaping/directing devices in order to achieve a required light distribution. This can be done dynamically in response to real-time scene information from the surrounding. Preferably, an angle 50 between the illumination light sources 44 and the illumination board 46 is actively controlled by actuators 52.

An option for mounting illumination light sources 44 with variable positions is the shown rigid-flex illumination board 46, where the illumination light sources 44 (e.g. VCSELs) are attached by flexible circuits that can be rotated or translated into position, either during the production process or in real-time. In particular, the figure shows individual VCSELs as illumination light sources 44 attached to the illumination board 46 by flexible cables 48. The flexible cables 48 allow the VCSELs to be rotated or translated to an optimum performance angle. The rotation of the VCSEL can be done dynamically or during production and thereby set at a fixed angle.

Figure 7A:
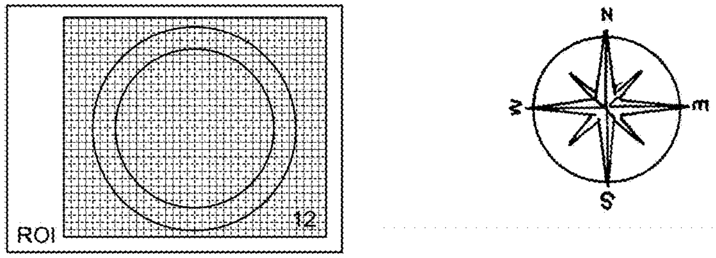
FIG. 7 a schematic illustration of a ROI based on an actual and/or prospected motion profile of a surround view imaging system according to the invention.
Figure 7B:
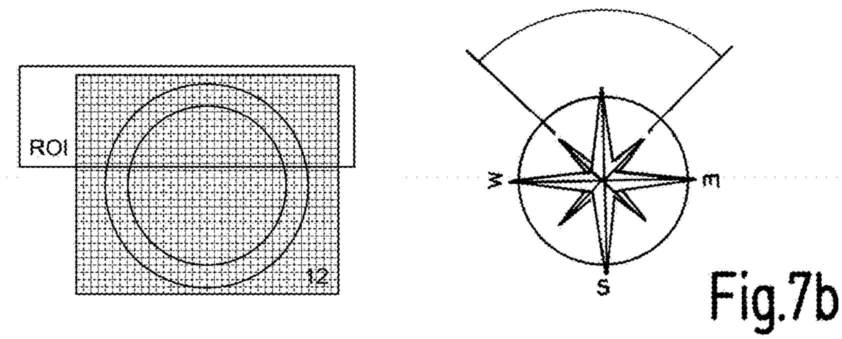

FIG. 7 shows a schematic illustration of a ROI based on an actual and/or prospected motion profile of a surround view imaging system according to the invention. Under a) a typical image detector readout, where all rows and columns of the image detector 12 are evaluated, is shown. However, the relevant imaging region onto which the surrounding is projected can also be only the region within the circular ring. The image within the circular ring can then be related to directions shown in the adjoining compass rose, so that the top section in the illustration corresponds to the forward direction, the right section to the right direction and so on. The readout is independent of the movement of the surround view imaging system and affects the entire image detector 12, i.e. all pixels are read out.

Under b), to increases the frame rates of the image detector 12, a detection controller limits the readout of the image detector to a region of interest, ROI, wherein the definition of the ROI is based on an actual and/or prospected motion profile of the system. As it can be seen in the figure, the readout is, for example, limited to the upper section of the image detector 12, which corresponds essentially to an imaging of the forward direction. The readout section is set by the detection controller via a definition of a specific ROI. The definition of the ROI can be based on an actual and/or prospected motion profile of the system, which allows to extract the relevant directions for imaging. The actual motion profile of the imaging system can be, for example, predefined by a programmed path or may be derived from sensors detecting the actual motion parameters like speed, travel direction, etc. A prospected motion profile of the imaging system can be derived from a programmed path or from pre-calculated encounters with obstacles, which can be expected to arrive immediately. A prospected motion profile can be used to increase the reaction time of an AMR or AGV.

Figure 8A:
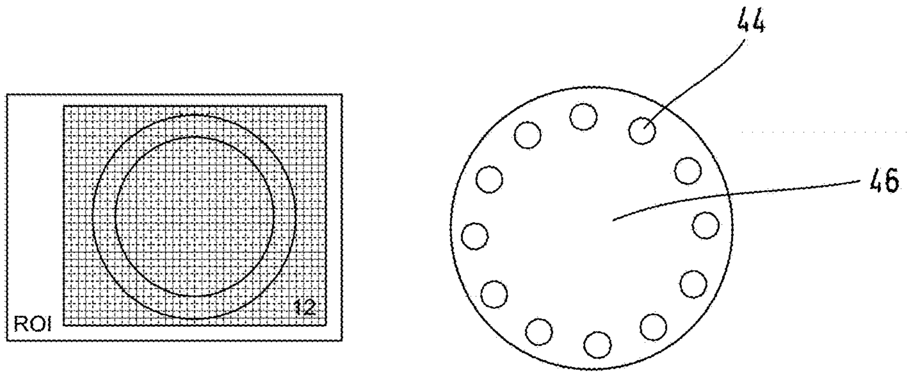
FIG. 8 a schematic illustration of controlling a spatial distribution of illumination power in combination with a ROI based on an actual and/or prospected motion profile of a surround view imaging system according to the invention.
Figure 8B:
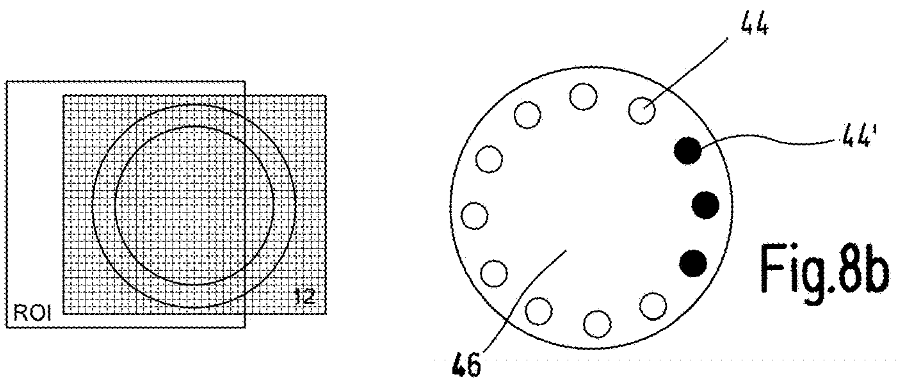

FIG. 8 shows a schematic illustration of controlling a spatial distribution of illumination power in combination with a ROI based on an actual and/or prospected motion profile of a surround view imaging system according to the invention. This embodiment is directly related to the use of a ROI as shown in FIG. 7. Under a) a configuration is exemplarily shown in which an illumination board 46 with several illumination light sources 44, which circumferentially emit illumination light, are configured to illuminate the entire 360 degrees surrounding. In this case, the surrounding within the field of view can be imaged completely.

Under b) an illumination controller is adapted to control a spatial distribution of illumination power to avoid that reflected illumination light is received by regions of the image detector which are outside of the ROI. In the exemplarily configuration shown, the ROI is set to have a detector readout anywhere over the image detector 12 except in the right direction. As this region of the surrounding is thus not detected, any illumination going in this direction would be wasted and contain the risk of some of that light being scattered and nevertheless captured by the imager. This can happen from multiple reflections, resulting in increased detection noise or even saturation and overexposure of the image detector 12. To avoid these problems, the corresponding illumination light sources 44' for directions out of the ROI may be dimmed or switched off completely.

| | | | |
|---|---|---|---|
| 10 | imager | 40 | illuminator |
| 12 | image detector | 42 | illumination controller |
| 20 | catadioptric lens | 44 | illumination light sources |
| 22 | first aspheric lens region | 46 | illumination board |
| 24 | second aspheric lens region | 48 | flexible cables (flex cables) |
| 26 | third aspheric lens region | 50 | angle |
| 30 | corpus | 52 | actuators |
| 32 | mantle | 60 | detection controller |
| 34 | top surface | 70 | diffusing element |
| 36 | bottom surface | | |
| A | illumination light | | |
| B | imaging light | | |
| C1 | center (bottom surface 36) | | |
| C2 | center (top surface 34) | | |
| FOV10 | field of view of the imager | | |
| FOV40 | field of view of the illuminator | | |
| FOV40a | primary illumination region | | |
| FOV40b | secondary illumination region | | |
| R | intermediate region | | |
| O | object | | |

What is claimed is:

1. An imager for a surround-view imaging system, comprising:

an image detector and a cylindrically shaped monolithic catadioptric lens having a corpus with a mantle, a top surface and a bottom surface;

wherein in a field of view of the imager, imaging light from a surrounding of the imager enters the corpus by the mantle, is firstly reflected by a circumferential first aspheric lens region arranged around a center of the bottom surface and formed as a Forbes asphere, is secondly reflected by a second aspheric lens region arranged at a center of the top surface, and leaves the corpus towards the image detector by a third aspheric lens region at the center of the bottom surface.

2. A surround-view imaging system for imaging a surrounding of the system, comprising:

an imager and an illuminator;

wherein the illuminator is adapted to illuminate in a field of view of the illuminator the surrounding of the system such that illumination light that is reflected by the surrounding can be imaged by the imager in a field of view of the imager as imaging light;

wherein the illuminator and the imager are arranged one over another and separated from one another by a distance d to form an intermediate region which is neither in the field of view of the illuminator nor in the field of view of the imager; and wherein the field of view of the illuminator simultaneously comprises a primary illumination region with high maximum illumination power and a secondary illumination region arranged between the primary illumination region and the imager with lower maximum illumination power.

3. A surround-view imaging system for imaging a surrounding of the system, comprising:

an imager having an image detector and a detection controller, and an illuminator;

wherein the illuminator is adapted to illuminate in a field of view of the illuminator the surrounding of the system such that illumination light that is reflected by the surrounding can be imaged by the imager in a field of view of the imager as imaging light;

wherein the detection controller increases frame rates of the image detector by limiting a readout of the image detector to a region of interest; and wherein a definition of the region of interest is based on a prospected motion profile of the system.

4. The surround-view imaging system according to claim 3, further comprising:

an illumination controller, wherein the illumination controller is adapted to control a spatial distribution of illumination power to avoid that reflected illumination light is received by regions of the image detector which are out of the region of interest.

5. The surround-view imaging system according to claim 2, wherein the illuminator comprises circumferentially arranged illumination light sources, and wherein the illumination light sources are electrically and mechanically connected to an related illumination board by a pivoting or moving bracket or holder.

6. The surround-view imaging system according to claim 5, wherein an angle between the illumination light sources and the illumination board is actively controlled by actuators.

* * * * *